UNITED STATES PATENT OFFICE 2,560,032

N,N'-PIPERAZINO BIS-SULFENAMIDES

George E. P. Smith, Jr., Akron, Ohio, assignor to The Firestone Tire & Rubber Company, Akron, Ohio, a corporation of Ohio No Drawing. Original application April 9, 1945, Serial No. 587,439. Divided and this application November 2, 1949, Serial No. 125,153

4 Claims. (Cl. 260—268)

This invention relates to new compounds which are accelerators of the vulcanization of rubber. This application is a division of my copending application Serial No. 587,439, filed April 9, 1945, now Patent No. 2,514,181.

The new compounds are N,N'-dialkylene bis-sulfenamides of the group consisting of the bis-thiazyl sulfenamides, the bis-thiazolinyl sulfenamides, and the bis-thiocarbamyl sulfenamides. The dialkylene amino groups are preferably of the piperazine type obtained by carrying out the reaction with a piperazine, either an unsubstituted piperazine or a substituted piperazine, such as methyl piperazine or 2,5-dimethyl piperazine, etc.

The new products which are accelerators are represented by the general formula:

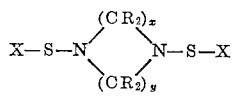

where R is hydrogen or a hydrocarbon radical, X is thiazyl, thiazolinyl or thiocarbamyl, and $x$ and $y$ are whole numbers, usually not greater than about 16 and preferably are 1, 2 or 3. $x$ and $y$ may be the same, as where piperazine or a dialkyl piperazine is used in producing the compounds; or they may be different as, for example, where either of the following is used:

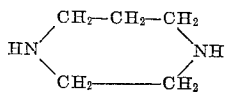

1,4-diazocycloheptene or trimethylene ethylene diamine

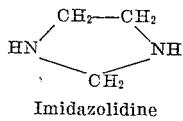

Imidazolidine

The compounds of this invention may be obtained by any usual method of preparing the sulfenamides. The following examples are illustrative:

Example 1

A solution of 10 grams of 2-mercaptobenzothiazole was prepared with 5.5 grams of sodium hydroxide in 100 to 200 cc. of water. The solution of sodium mercaptobenzothiazole was filtered and to it was added 46.4 grams of piperazine hexahydrate. The solution was diluted somewhat, and while being cooled and stirred, it was treated with 15.2 grams of iodine in dilute aqueous potassium iodide solution. The first precipitate was colored and poor, and this was filtered off and discarded. After adding an additional 23.2 grams of piperazine hexahydrate, further oxidation produced a white- or cream-colored solid. This was in part pasty, and when dry, it melted over a wide range from 130° to 140° C. and up. It was obviously a mixture of products containing the desired bis-sulfenamide. On repeated recrystallization, a product melting at 190° to 192° C. is obtained.

*Analysis.*—Found: % N=13.4; % S=30.65. Calculated for N,N'-piperazino bis(benzothiazyl sulfenamide): % N=13.45; % S=30.75.

Example 2

A solution of the sodium salt of 2-mercapto 4,5-dimethyl thiazole was prepared from 7.5 grams of the mercaptothiazole and 4.74 grams of sodium hydroxide in several hundred cubic centimeters of water. This was filtered, and to it were added, first, 50 grams and then another 50 grams (total=100 grams) of piperazine hexahydrate. The solution was cooled and stirred while 13.15 grams of iodine in aqueous potassium iodide was slowly added. A cream-colored, finely divided solid was formed. This melted at 140° to 145° C. On purification a product melting at 153.5° to 154° C. is obtained.

*Analysis.*—Found: % N=15.4; % S=34.7. Calculated for N,N'-piperazine bis(4,5-dimethyl thiazyl sulfenamide): % N=15.2; % S=34.4.

Other accelerators of the invention include:

N,N'-piperazine bis (4-methyl thiazyl sulfenamide)

N,N'-2,5-dimethyl piperazine bis(4-ethyl thiazyl sulfenamide)

N,N'-piperazine bis (dimethyl thiocarbamyl sulfenamide)

N,N'-piperazine bis (thiazolinyl sulfenamide)

N,N'-trimethylene ethylene diamine bis(benzothiazyl sulfenamide)

N,N'-imidazolidine bis(benzothiazyl sulfenamide)

N,N'-piperazine bis(benzothiazyl sulfenamide) and N,N'-piperazine bis(4,5-dimethyl thiazyl sulfenamide), prepared according to the above two examples, were tested as accelerators of rubber and compared with N-cyclohexyl benzothiazyl sulfenamide as a control, by first compounding them according to the following formula:

| | Parts by weight |
|---|---|
| Rubber | 100 |
| Sulfur | 3 |
| Stearic acid | 1.10 |
| Zinc oxide | 5 |
| Accelerator | 0.75 |

These stocks were cured at different temperatures for different periods of time with the following results:

| Cured at 240° F. | 600% Modulus | | | Tensile at Break | | |
|---|---|---|---|---|---|---|
| | 30 | 40 | 120 | 30 | 60 | 120 |
| Control | | | 2,200 | | | 4,150 |
| Example 1 | | | 725 | | | 2,850 |
| Example 2 | | | 850 | | | 2,675 |

| Cured at 280° F. | 600% Modulus | | | | Tensile at Break | | | |
|---|---|---|---|---|---|---|---|---|
| | 20 | 40 | 60 | 100 | 20 | 40 | 60 | 100 |
| Control | 1,500 | 2,525 | 2,100 | 1,450 | 3,925 | 3,825 | 3,500 | 3,500 |
| Example 1 | | 2,150 | 1,750 | 1,400 | | 3,750 | 3,450 | 3,300 |
| Example 2 | 525 | 1,775 | 2,150 | 1,800 | 2,700 | 3,450 | 3,675 | 3,075 |

The times of cure are given in minutes immediately below the Modulus and Tensile headings in the above tables.

It is seen that these compounds are excellent delayer-action accelerators.

What I claim is:

1. A sulfenamide of the formula

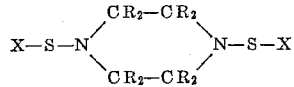

wherein R is selected from the group consisting of hydrogen and methyl radicals and X is selected from the group consisting of thiazyl, thiazolinyl and thiocarbamyl radicals.

2. A N,N'-piperazino bis-thiazyl sulfenamide.

3. N,N' - piperazino bis(benzothiazyl sulfenamide).

4. N,N'-piperazine bis(4,5-dimethyl thiazyl sulfenamide).

GEORGE E. P. SMITH, Jr.

REFERENCES CITED

The following references are of record in the file of this patent:

UNITED STATES PATENTS

| Number | Name | Date |
|---|---|---|
| 2,024,605 | Sebrell | Dec. 17, 1935 |
| 2,271,834 | Carr | Feb. 3, 1942 |
| 2,485,550 | Aeschlimann et al. | Oct. 25, 1949 |

FOREIGN PATENTS

| Number | Country | Date |
|---|---|---|
| 732,922 | France | Mar. 15, 1932 |